(12) United States Patent
Zalila et al.

(10) Patent No.: US 6,948,729 B2
(45) Date of Patent: Sep. 27, 2005

(54) METHOD AND DEVICE FOR MANAGING SLOT PARKING OF MOTOR VEHICLES

(75) Inventors: Zyed Zalila, Villers sur Coudun (FR); Guillaume Gueydan, Compiegne (FR)

(73) Assignee: Intellitech (Intelligent Technologies), Compiegne (FR)

(*) Notice: Subject to any disclaimer, the term of this patent is extended or adjusted under 35 U.S.C. 154(b) by 0 days.

(21) Appl. No.: 10/240,245

(22) PCT Filed: Mar. 27, 2001

(86) PCT No.: PCT/FR01/00917
§ 371 (c)(1),
(2), (4) Date: Jun. 21, 2003

(87) PCT Pub. No.: WO01/74643
PCT Pub. Date: Oct. 11, 2001

(65) Prior Publication Data
US 2004/0020699 A1 Feb. 5, 2004

(30) Foreign Application Priority Data
Mar. 31, 2000 (FR) .......................................... 00 04126

(51) Int. Cl.⁷ ............................ B60S 11/00; G06F 15/20
(52) U.S. Cl. ........................................ 280/204; 701/44
(58) Field of Search ................................ 180/204, 402, 180/443, 446, 422; 701/41, 42, 43, 44

(56) References Cited

U.S. PATENT DOCUMENTS 4,931,930 A * 6/1990 Shyu et al. .................... 701/36
5,742,141 A * 4/1998 Czekaj ......................... 318/587
6,424,895 B1 * 7/2002 Shimizu et al. ................ 701/41
2002/0104700 A1 * 8/2002 Shimazaki et al. ......... 180/204

FOREIGN PATENT DOCUMENTS

| DE | 198 09 416 A | 9/1999 |
| DE | 199 22 284 A | 11/1999 |
| EP | 0 835 796 A | 4/1998 |
| FR | 2 728 859 | 7/1996 |
| FR | 2 780 936 A | 1/2000 |

* cited by examiner

Primary Examiner—Kevin Hurley
(74) Attorney, Agent, or Firm—Young & Thompson (57) ABSTRACT

A method and a device for slot parking of a mobile vehicle (1), the slot parking (15) includes positioning (19,22), locking (23,25), unlocking (26,27) and realigning (28,29) phases, the method using elements to evaluate available parking space relative to immediate surroundings. The method consists in: retrieving quantitative input values from sensors, which are transformed or not into gradual qualitative input values; determining on the basis of qualitative rules operating instructions which supply gradual qualitative output data and quantitative output data, which are transformed into quantitative output data to control the vehicle actuators. The invention is useful for parking any type of powered vehicles whereof the wheel can be locked on a common axle, and can be used on public roads, private parking lots or production sites of companies.

13 Claims, 6 Drawing Sheets

METHOD AND DEVICE FOR MANAGING SLOT PARKING OF MOTOR VEHICLES

BACKGROUND OF THE INVENTION

The present invention relates to a method and a device for managing the slot parking of motorized vehicles such as automobiles, robots and motorized trucks, the wheel or wheels of a common axle of which can be locked.

It will find its application on public roads and private parking lots for the slot parking of vehicles and on production sites of companies for the parking of vehicles which serve for example for the packaging of products. It will also be implemented by automobile manufacturers, and manufacturers of robots and motorized trucks.

SUMMARY OF THE INVENTION

Slot parking is performed with respect to immediate surroundings which consist of walls, sidewalk curbs, other vehicles and other obstacles such as fire hydrants and posts. However, the maneuver is generally performed so as to position the vehicle between two other vehicles of the same type.

The parking operation is split up into four phases. The first phase is a positioning phase in which the vehicle must be suitably located with respect to immediate obstacles, front and back of the vehicle.

The second phase is a locking phase in which the vehicle moves backward and locks the wheels so as to allow the back of the vehicle to enter the parking space in which it is to be parked.

The third phase of the slot parking is a reverse-locking phase in which the vehicle, once the locking phase has terminated, that is to say once the back of the vehicle is suitably located in the available parking space, moves backward and reverse-locks the wheels so as likewise to allow the front part of the vehicle to be properly located in the parking space in which it is to be parked.

Once this reverse-locking phase is concluded, the fourth phase consists in realigning the vehicle and to do this, the vehicle moves forward or backward according to the available front and back space, while straightening its wheels.

Among the operators who have to carry out this type of parking, that is to say the drivers of vehicles, some are more experienced than others and consequently drivers who are rather inexpert or who are not very skilful in performing the maneuver have to repeat it several times before they succeed in parking suitably. Operators of this type therefore have the drawback of impeding the flow of other vehicles for the time that the maneuver is being carried out and these unaccomplished operators sometimes strike the immediate obstacles and damage them and also their own vehicle, thereby incurring subsequent repair costs and hence additional vehicle servicing costs.

Likewise, certain operators, even accomplished ones, undertake the parking maneuver without actually realizing that the parking space available is not large enough relative to the size of their vehicle. These drivers therefore try to position themselves in the parking zone and then end up being blocked, during the operation, not having sufficient space and running the risk of hitting the immediate obstacles. By being blocked, these drivers therefore also impede the proper operation of the flow of the other vehicles and run the risk of creating damage to immediate obstacles and on their vehicle.

For this purpose, means exist which consist firstly in ensuring that the space available to park the vehicle in a slot is sufficient depending on the type of vehicle involved. To do this, devices and methods for evaluating the space available are known, these informing the driver as to the possibilities of performing the slot parking maneuver without catching on immediate obstacles and as a function of the size of his automobile.

Specifically, the vehicle is equipped with one or more sensors and with evaluation means, a first function of which is to detect the distance which separates the obstacles front and back of the vehicle between which the driver wishes to park. The device then informs the operator whether he can perform the maneuver with no difficulty and with no risk of catching on immediate obstacles as a function of the size of his vehicle.

Other devices have been developed for implementing a system for managing automatic parking on vehicles, devices developed more especially on motor vehicles. These consist firstly in analyzing the space available in which the driver wishes to park his automobile, then as a function of the space available, the system calculates a vehicle positioning instruction curve. When this instruction curve is calculated, the vehicle is located by action on the wheels, the direction of travel and the speed by following the predefined instruction curve.

This instruction curve is no longer modified once it has been calculated by the system and consequently, when the space available alters over time, and while the slot parking is being carried out, the system disregards the various alterations in the surroundings and continues the maneuver on the basis of the predefined instruction curve, thereby running the risk of catching on the immediate surroundings which may be undergoing alteration. For example, when the front or back vehicle starts up again, or when a person enters the parking zone, the vehicle nevertheless continues the parking maneuver which it has undertaken.

Moreover, this instruction curve is based on purely mathematical calculation rules which do not correspond exactly with the natural maneuver customarily employed by the driver. So much so that the driver does not feel safe during the conduct of the maneuver which is performed differently from his customary practice. All of a sudden the driver may wish to interrupt the maneuver and retake control of the vehicle without having any valid reason to do so, similarly impeding the proper operation of the flow of traffic.

The present invention aims to remedy the drawbacks of the existing systems and one of the main aims is to propose a system for managing the slot parking of a mobile vehicle which is founded on gradual qualitative rules based on human expertise, so as to reconstruct the parking maneuver which is as close as possible to that which the expert or accomplished operator would have performed manually without any assistance.

To do this, the invention has the advantage of giving operating instructions for action on the control members of the vehicle which are effected as the maneuver progresses and after having analyzed the position which the vehicle has reached with respect to its immediate surroundings, by retrieving the information regarding distance, orientation and direction of travel by means of the sensors. The action on the control members being effected moreover in a qualitative manner such as would be effected by an operator driving manually who reacts according to the progress of events.

The invention also has the advantage of allowing the use of sensors providing rather inaccurate measurements, either because these sensors are of medium quality and low cost, or because the sensors are complex as regards their fine-tuning. Specifically, the data transmitted need not necessarily be very accurate since they are then transformed into gradual qualitative data.

Moreover, the invention has the advantage of verifying, during the vehicle parking operation, whether the vehicle's immediate surroundings have not altered with respect to the start of the maneuver. Specifically, the position of the vehicle with respect to the immediate surroundings is measured during the progress of the maneuver and in the case where an additional obstacle, for example a person, were to enter the parking zone, the system detects this and reacts instantaneously either by rectifying the maneuver, if the latter is still achievable, or by interrupting the slot parking if the distance between the additional obstacle and the vehicle is deemed to be too dangerous.

The invention also has the advantage of being very flexible as regards the choice and the definition of the gradual qualitative rules which are founded on human expertise and experience. Specifically, the choice of these rules may be very wide and as a direct consequence thereof, depending on the complexity or simplicity chosen, the number of operating instructions for acting on the wheels, the direction of travel and the speed of the vehicle is increased or decreased.

Another advantage of the present invention is that it allows the operator to retake control of the vehicle at any instant, simply by manipulating the vehicle's control members such as the steering wheel, the brake pedal or the gearbox, thereby improving the feeling of wellbeing and of safety of the driver who can interrupt the maneuver if he deems it necessary to do so or if he wishes to change space at the last moment.

Another aim of the present invention is to make the operator safe during the parking maneuver. To do this, the invention has the advantage of informing the operator directly if the latter so wishes regarding the operations to be performed on the control members of the vehicle. In this case, the operator plays the role of actuator directly and is controlled by the information received visually, aurally: or kinesthetically (tactile aspect). Kinesthetic is understood to mean the informing of the driver through sensory actions on the hands, the feet, or any other part of the body in physical contact with the interior of the vehicle.

The present invention relates to a method for managing the slot parking of a mobile vehicle which can be used to park any type of motorized vehicle, the wheels of a common axle of which can be locked, with respect to the immediate surroundings which may be found on public roads, private parking lots and production sites of enterprises, said slot parking consisting of at least two phases, namely a locking phase and a reverse-locking phase, and possibly of two other phases, namely a positioning phase which precedes the two locking and reverse-locking phases and a realignment phase which follows the reverse-locking phase, said method using measurement sensors for measuring distance, orientation and speed which make it possible to evaluate the space available with respect to the immediate surroundings so as to perform the parking maneuver, the latter being carried out by operating on the speed, the direction of travel and the relative lock of the wheels of the vehicle, characterized in that, in order to carry out parking:

the input data originating from the measurement sensors which provide quantitative values are retrieved, some of these quantitative input values are translated into gradual qualitative input values, on the basis of qualitative rules, operating instructions are determined which provide gradual qualitative output data and quantitative output data, these gradual qualitative output data are transformed into quantitative output data, the actuators of the vehicle are controlled as a function of the quantitative output data obtained.

It also makes reference to the device for managing the slot parking of a mobile vehicle which implements the method, characterized in that it comprises:

measurement sensors for measuring the distance of the vehicle with respect to surrounding obstacles, speeds sensors, direction of travel sensors and vehicle orientation sensors, a computer which retrieves the quantitative data from the measurement sensors and transforms the input data into gradual qualitative values and into quantitative values, processes and determines output instructions which have gradual qualitative values and quantitative values and transforms these output instructions into quantitative values, actuators which act on the movements of the vehicle as a function of the quantitative output values transmitted by the computer or an output interface which transmits visual and/or audible and/or kinesthetic information to the driver to guide him in his maneuver.

BRIEF DESCRIPTION OF THE DRAWINGS

The invention will be better understood on reading the following description which is based on the explanatory figures, namely:

FIG. 1 which depicts an operating algorithm of the system and of its surroundings, FIGS. 2, 3, 4, 5 and 6 which depict the various phases of a slot parking, FIG. 7 which depicts an operating algorithm of the slot parking method itself, FIG. 8 which depicts an exemplary installation of sensors on the vehicle, FIG. 9 which depicts the architecture of the system installed on a vehicle, FIGS. 10a, 10b, 10c and 10d which depict a case of determining the output operating instructions.

DESCRIPTION OF THE PREFERRED EMBODIMENTS

The present invention relates to a method and device for managing slot parking of a mobile vehicle (1), where a vehicle (1) is understood to mean any motorized vehicle whose wheels belonging to a common axle may be locked, such as for example motor vehicles which travel on public or private roads and which have to be slot parked in a parking zone (2) with respect to immediate surroundings (3) which consist, in this case and for example, of automobiles (3), walls, trees, posts, sidewalk curbs and fire hydrants.

Other examples of mobile vehicles (1) are robots and motorized trucks which serve on production sites for the packaging and storage of products and which have to be located very accurately by performing a slot maneuver with respect to immediate surroundings (3) so as to locate the products suitably at the desired spot. In this case and for example, the immediate surroundings are made up of production machines, cabinets and storage shelves, walls and other mobile vehicles of the same type.

The maneuver of slot parking of the vehicle (1) with respect to its surroundings (3) is split up into four phases which are positioning, locking, reverse-locking and realignment, such as represented in FIGS. 2, 3, 4, 5 and 6.

Figure 2:
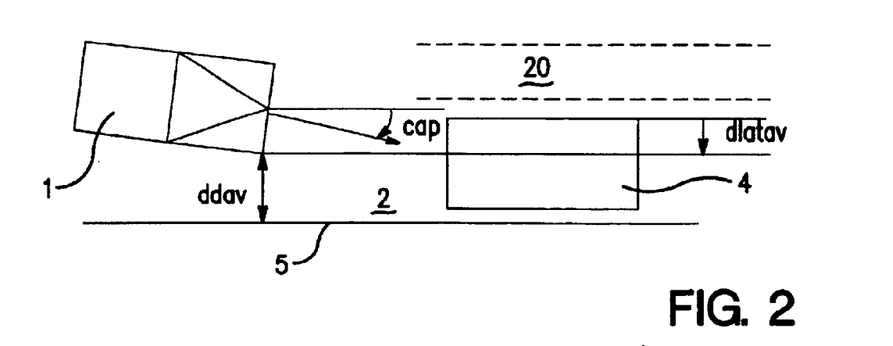
Figure 3:
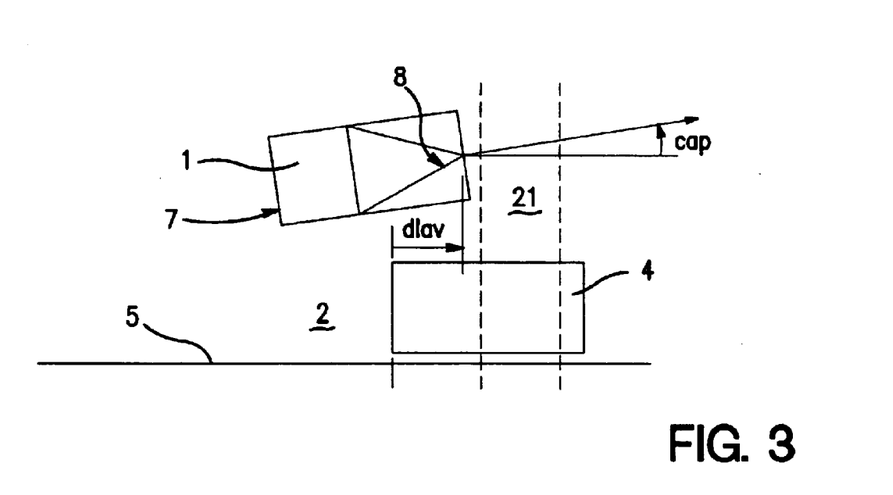

During the first positioning phase, the vehicle (1) must firstly be located suitably with respect to the front obstacle (4). To do this, the vehicle must be located both laterally and longitudinally with respect to the obstacle, for example another vehicle. For the lateral positioning, such as depicted in FIG. 2, the vehicle must be a satisfactory distance (20) from the front obstacle (24) while being as parallel as possible to the edge (5) of the parking zone. And for the longitudinal positioning, such as depicted in FIG. 3, the vehicle must be located a satisfactory distance (21) in front of the charted parking zone.

Figure 4:
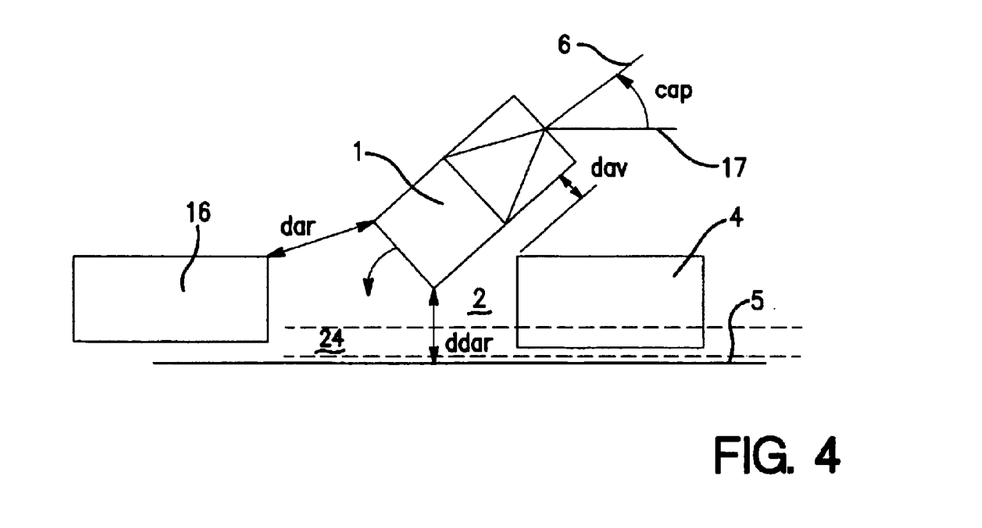

For the second locking phase, such as depicted in FIG. 4, the back of the vehicle (1) enters the parking zone (2) and approaches the edge (5) of the parking zone for example the curb of a sidewalk or the surface of a wall. During this locking phase, the vehicle moves backward and locks the wheels so as to enter the parking zone and approach the edge of the parking zone, and is therefore oriented along an axis (6) different from that of the edge (5) of the parking zone.

Figure 5:
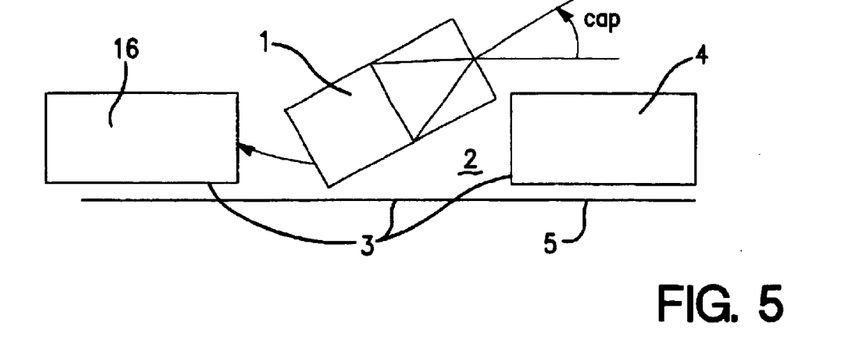

The third reverse-locking phase, which is depicted in FIG. 5, comes about when the locking phase is sufficiently advanced and when the back (7) of the vehicle (1) reaches a satisfactory distance (24) with respect to the edge (5) of the parking zone. The vehicle must then reverse-lock the wheels while continuing to move backward so that the front part (8) of the vehicle also enters the parking zone (2).

Figure 6:
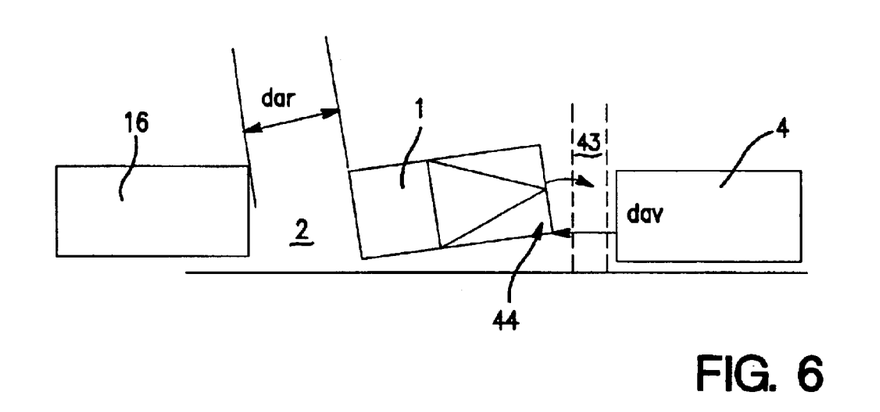

The fourth realignment phase, depicted in FIG. 6, consists in resetting the vehicle (1) properly parallel to the edge (5) of the parking zone, together with the wheels of the vehicle, once the third reverse-locking phase is concluded, that is to say when the vehicle (1) has entered the parking zone completely.

Figure 1:
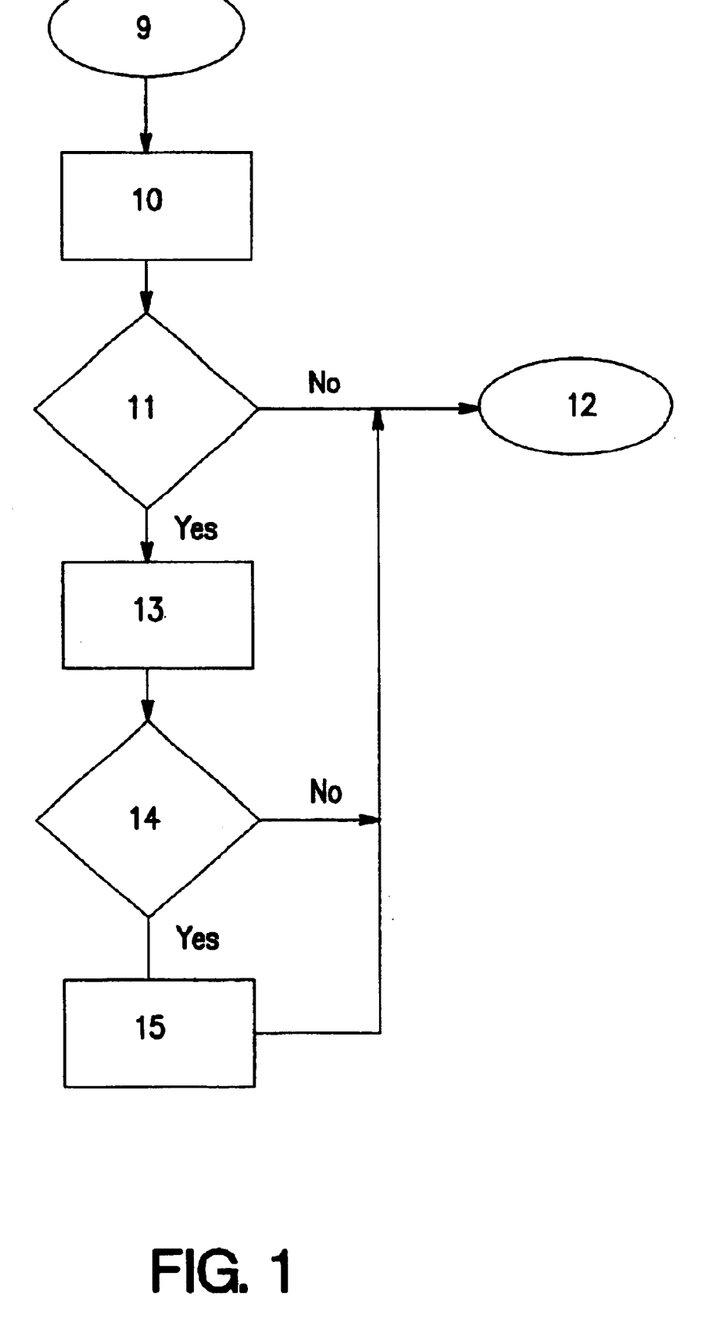

The management of the slot parking comes about once the driver engages the method, this corresponding to the start (9) of the operating algorithm of the system depicted in FIG. 1. The first phase consists firstly in evaluating whether the parking space available is large enough compared with the size of the vehicle.

To do this, the space (10) available for parking the vehicle at the spot chosen by the operator must be evaluated. Once the available space has been evaluated (10), a check verifies that this space is sufficient (11) for the vehicle and throughout the maneuver, a safety test (32) makes sure that this space remains sufficient.

Numerous processes have already been developed for evaluating the distance which separates two obstacles between which the driver wishes to park his vehicle, such as for example measuring the distance between the back of the vehicle (7) and the back obstacle (16) and the distance between the front of the vehicle (8) and the front obstacle (4) by means of sensors (36) of infrared, laser or ultrasound type, and as a function of the measured distances, validating or otherwise the possibility of parking the vehicle.

Another example consists in comparing the distance which separates the two obstacles, front (4) and back (16), with the size of the vehicle (1). In this case, the distance is for example measured by means of a camera which analyzes the dark zones corresponding to the obstacles with respect to the light zone corresponding to the empty parking space.

Next, when the space has been evaluated, either this available space is not large enough with respect to the size of the vehicle and in this case the parking of the vehicle is concluded (12), or the parking space is sufficient and in this case confirmation (13) is requested from the operator to manage the slot parking and the confirmation response of the operator is tested (14). If the confirmation is "NO" then the slot parking is concluded (12) and if the response is "YES" then the slot parking (15) of the vehicle is carried out. Next, when the parking has terminated, the management of the slot parking is concluded (12).

The vehicle is equipped with sensors (36) for measuring the distance between the mobile vehicle (1) and the surrounding obstacles (3), with sensors for measuring orientation of the vehicle for determining the angle between the axis (6) of the vehicle and the axis (17) parallel to the edge (5) of the roadway, with sensors for measuring the direction of travel of the vehicle and with sensors for measuring speed. Together these sensors (36) provide fixed quantitative measurements, for example a binary quantitative value such as forward or backward or else 0 or 1, and others providing a variable quantitative value, in particular the measurements of distance and of orientation.

When the phase (10) of evaluating the available space is validated, that is to say it is possible to park the vehicle in a slot, and when the operator has confirmed (13) his desire to park the vehicle in a slot, the parking operation can then take place and consequently the following is undertaken in order to carry out the slot parking:

the input data originating from the measurement sensors which provide quantitative values are retrieved, some of these quantitative input values are translated and transformed into gradual qualitative input values, also referred to as fuzzy values, the other input data retaining their quantitative value, on the basis of qualitative rules, also referred to as fuzzy rules, operating instructions are processed and determined which provide gradual qualitative output data and quantitative output data, these gradual qualitative output data are transformed into quantitative output data, the other quantitative output data retaining their value, the actuators of the vehicle are controlled as a function of the quantitative output data obtained.

The parking operation is performed in real time, that is to say the input data are retrieved from the sensors at each instant and the actuators are also controlled at each instant during the entire progress of the slot parking maneuver. To do this, a measurement of the sensors is performed with a very low period, for example every 10 ms and the actuators of the vehicle are also controlled every 10 ms, after operating instructions have been determined.

Thus, during the entire parking operation, the position and the movement of the vehicle with respect to the surrounding obstacles are evaluated at each instant, and the actuators of the vehicle are acted on, also at each instant, in real time, during the progress of the parking maneuver, said actuators controlling the speed, the direction of travel and the relative lock of the wheels of the vehicle, that is to say the position and the movement of the vehicle are controlled with respect to immediate obstacles so as to carry out the slot parking.

In this way, the maneuver is performed such as an experienced operator would perform it manually without any assistance.

The decisions determined by the parking management system are transmitted to the actuators of the vehicle (1) so that they directly control the speed, the direction of travel and the wheel lock of the vehicle, or to the operator via the output interface (41) so as to inform him as to the actions which he should perform on the accelerator pedal, brake pedal and clutch pedal, on the gearbox and on the steering wheel.

The measurement data regarding the distances and orientation of the vehicle with respect to obstacles which are retrieved are in a preferential but nonlimiting mode those depicted in FIGS. 2, 3, 4, 5 and 6, namely:

- the front right distance (ddav) which corresponds to the distance separating the right front of the vehicle from the edge of the parking zone or from the obstacle at the border (5) of which one wishes to park. The value provided by this front right distance is a quantitative value which the operator can assess visually.
- the back right distance (ddar) which corresponds to the distance separating the right back of the vehicle from the edge of the parking zone or from the obstacle at the border of which one wishes to park. This back right distance is a value which can be assessed by the operator.
- the heading of the vehicle (heading) which represents the orientation of the vehicle with respect to the obstacle alongside which one wishes to park the vehicle. The value obtained is a quantitative value which the operator can assess during the progress of the parking maneuver.
- the distance with respect to the front vehicle (dav) which represents the space between the vehicle (1) and the back of the obstacle parked in front of the parking zone.
- the longitudinal distance with respect to the front vehicle (dlav), measured along the parking axis.
- the relative longitudinal distance with respect to the longitudinal position instruction (dlavr) which is equal to the longitudinal distance with respect to the front vehicle minus half the length of the longitudinal position instruction interval (21).
- the lateral distance with respect to the front vehicle (dlatav) which is a lateral distance perpendicular to the parking axis.
- the relative lateral distance with respect to the lateral position instruction (dlatavr) which is equal to the lateral distance with respect to the front vehicle minus half the lateral position instruction interval (20).

Measurement data regarding the direction of travel of the vehicle are also retrieved. The measurement of the direction of travel provides a fixed quantitative value which is either forward, backward or idling.

Test results which have a binary value which is either 0 (validated), or 1 (non validated) are also retrieved.

Of all the values retrieved, the fixed quantitative and/or binary values are retained as they stand and the variable quantitative values are transformed into gradual qualitative values.

These gradual qualitative values correspond to the assessment which an operator would have as regards his position, his orientation and his speed, such as for example move forward or backward very quickly, quickly, slowly or very slowly, or else position very far from, far from, close to or very close to an obstacle, likewise vehicle greatly or slightly at an angle with respect to the edge of the parking zone.

Once these quantitative input data have been transformed into gradual qualitative input data and into fixed quantitative and/or binary data, operating instructions for acting the vehicle are then processed and determined, on the basis of nonlinear qualitative rules, these operating instructions corresponding to fixed quantitative and/or binary values and to gradual qualitative values which then have to be transformed next into quantitative values to control the actuators of the vehicle.

The processing of the information is performed in real time, that is to say the data of the sensors are retrieved and operating instructions are processed and determined at each instant in time so as to analyze the entire progress of the maneuver with respect to its surroundings and act at the same time on the vehicle according to circumstances.

Figure 7:
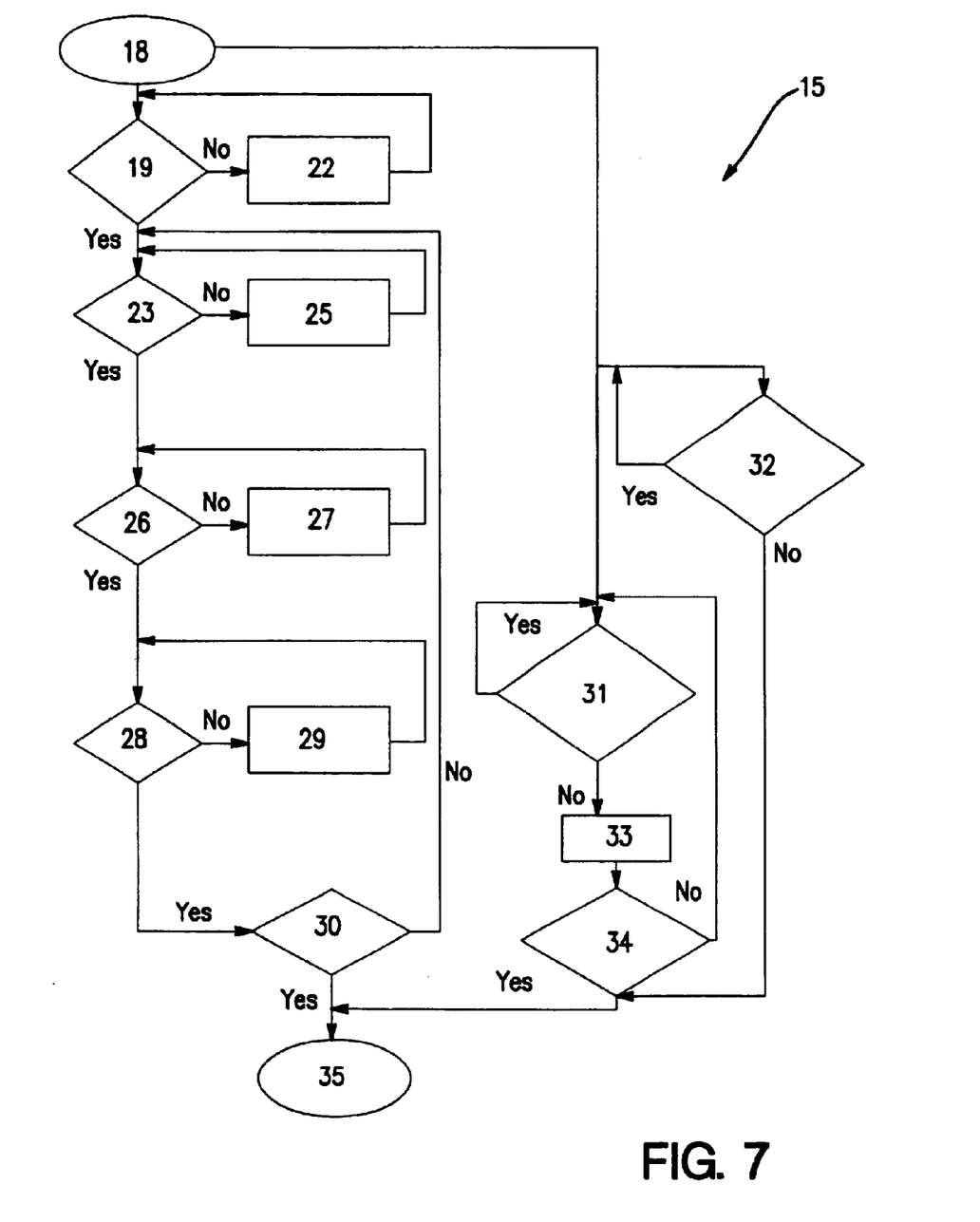

FIG. 7 depicts in detail the operating algorithm for the operation of slot parking (15) of a vehicle (1). When the available space has been validated and the operator has confirmed his wish to park the vehicle, the start (18) of the parking is then activated and instigates two operations simultaneously, the first operation consisting in carrying out the parking and the second in performing safety tests in parallel with the parking.

The first operation, that is to say the carrying out of the parking, is split in a preferential but nonlimiting mode into four phases which are positioning, locking, reverse-locking and realignment, the switch from one phase to another occurring only if the position of the vehicle in each of the phases is deemed sufficient and validated by test.

In the first positioning phase, a first test (19) is performed, which will then be referred to as "test 1", which makes it possible to evaluate the longitudinal position and the transverse position of the vehicle during the positioning phase. This test 1 pertains to the following variables: lateral distance with respect to the front vehicle (dlatav), longitudinal distance with respect to the front vehicle (dlav) and the heading of the vehicle (heading) which must lie respectively in a lateral position instruction interval $[\alpha_1, \alpha_2]$ (in meters) (20), a longitudinal position instruction interval $[\beta_1, \beta_2]$ (in meters) (21) and an orientation instruction interval $[\omega_1, \omega_2]$ (in radians). The first test 1 (19) is validated when these three conditions above are fulfilled. Otherwise, test 1 is not validated.

If test 1 is not validated, then the positioning (22) is carried out and this operation is repeated until test 1 is validated, after which we go to the second locking phase.

In the second locking phase, a second test (23) referred to in the subsequent text as "test 2" is performed which makes it possible to evaluate the position of the back of the vehicle (7) at the edge (5) of the parking zone, for example a sidewalk or a wall, during the locking phase. This test 2 (23) pertains to the back right distance variable (ddar) which must lie in a back position instruction interval $[\gamma_1, \gamma_2]$ (in meters) (24). This second test 2 is validated when this condition is fulfilled. Otherwise, test 2 is not validated.

When test 2 is not validated, locking (25) is then carried out and this operation is repeated until test 2 is validated, after which we go to the third reverse-locking phase.

For the third reverse-locking phase, a third test (26) is performed which will subsequently be referred to as "test 3" (26) which makes it possible to evaluate the orientation of the vehicle during the reverse-locking phase. This test 3 pertains to the vehicle heading variable (heading) which must lie in a vehicle orientation instruction interval $[\delta_1, \delta_2]$ (in radians). This test 3 is validated when the condition is fulfilled. When test 3 is not validated, reverse-locking (27) is carried out and this operation (27) is repeated until test 3 is validated, after which we go to a fourth realignment phase.

For the fourth realignment phase, a fourth test (28) is performed which will subsequently be referred to as "test 4", which makes it possible to evaluate the distance to the other vehicles and the orientation of the vehicle during the realignment phase. This test 4 pertains to the following variables: distance with respect to the front vehicle (dav), distance with respect to the back vehicle (dar) and heading of the vehicle (heading) which must respectively lie in a position to the front vehicle instruction interval $[\kappa_1, \kappa_2]$ (in meters) (43), be greater than a position to the back vehicle instruction value $\epsilon$ (in meters), and lie in an almost zero orientation instruction interval $[\eta_1, \eta_2]$ (in radians). This test 4 is validated if the three conditions above are true, that is to say lie in the defined intervals. As long as test 4 is not validated, realignment (29) is carried out and this operation is repeated until test 4 is validated, after which we go to a fifth monitoring test (30) which will subsequently be referred to as "test 5".

This test 5 makes it possible to evaluate the distance to the edge (5) of the parking zone (2) as well as the orientation of the vehicle once the realignment phase is concluded. This test 5 is an end of maneuver test and it is validated when the vehicle is suitably parked. To do this, test 5 pertains to the front right distance variable (ddav) and heading of the vehicle (heading) which must respectively lie in a lateral position of parking instruction interval $[\lambda_1, \lambda_2]$ (in meters) and lie in a zero orientation instruction interval $(4_1, 4_2)$ (in radians) and it is validated when these two conditions are fulfilled. If test 5 is validated, then the parking operation (15) is concluded (35) else the three phases of locking, reverse-locking and realignment are repeated until validation of test 5.

The second operation which consists in carrying out safety tests in parallel while carrying out the parking makes it possible to guarantee the proper conduct of the maneuver and to avoid risking an accident with the surrounding obstacles.

To do this, two safety tests are carried out simultaneously. The first safety test (31) subsequently referred to as safety test 1 makes it possible to evaluate the actions of a possible operator on the control members of the vehicle (1), such as for example the clutch pedal, brake pedal and accelerator pedal, the steering wheel and the gearbox. As long as safety test 1 is validated, that is to say the operator does not manipulate any of the control members of the vehicle, this safety test 1 is repeated while continuing to carry out parking. Conversely, if safety test 1 is not validated, that is to say the operator has manipulated one of the control members of the vehicle, then the operator is requested to validate (33) his desire to retake manual control of the vehicle and this validation of halting (34) is tested. If the validation of halting test (34) is validated, then the parking operation (15) is concluded (35).

The second safety test (32), subsequently referred to as "safety test 2", makes it possible to evaluate the distance separating the vehicle from the obstacles delimiting the parking zone. This test is not validated if one of these distances is deemed dangerous for the subsequent operations, such as for example when there is an unforeseen and dangerous displacement of one of the obstacles or in the case of a failure of one of the sensors. In this case, the parking operation (15) is concluded (35). In the converse case in which safety test 2 is validated, parking continues to be carried out normally.

The carrying out of positioning (22) is performed by simultaneously administering the lateral position of the vehicle and the longitudinal position of the vehicle. To administer the lateral position of the vehicle, we proceed in the following manner:

the lateral position of the vehicle is monitored by retrieving four input data, obtained from the measurements of the sensors, two input data taking a quantitative value, namely the direction of travel and the result of test 1, and the other two input data taking a gradual qualitative value, namely the heading of the vehicle (heading) and the relative lateral distance with respect to the lateral position instruction (dlatavr), the wheel lock operating instruction which takes a gradual qualitative value is processed and determined on the basis of qualitative rules and is translated and transformed subsequently into a quantitative value, the wheel lock is acted upon as a function of the quantitative value obtained.

Simultaneously, to administer the longitudinal position of the vehicle during the positioning operation, we proceed in the following manner:

the longitudinal position of the vehicle is monitored by retrieving three input data, obtained from the measurements of the sensors, two input data taking a quantitative value, namely the result of test 1 and the direction of travel, and one input data item taking a gradual qualitative value namely the relative longitudinal distance (dlavr), operating instructions for acting on the speed and the direction of travel which both take a quantitative value are then processed and determined on the basis of qualitative rules, the speed and the direction of travel are acted upon as a function of these two quantitative values obtained.

The carrying out of locking (25) is performed when the first positioning phase is concluded. To carry out this locking, we therefore proceed in the following manner:

the lock is monitored by retrieving three input data, obtained from the measurements of the sensors, an input data item taking a quantitative value, namely test 2, and two data taking a gradual qualitative value, namely the heading of the vehicle (heading) and the back right distance with respect to the edge of the parking zone (ddar), operating instructions for acting on the speed and the direction of travel which take a quantitative value, and on the wheel lock which takes a gradual qualitative value are then processed and determined and are translated and transformed into a quantitative value, the speed, the direction of travel and the wheel lock of the vehicle are acted upon as a function of the quantitative values obtained.

The carrying out of reverse-locking (27) comes about in the third reverse-locking phase when the second locking phase has terminated. To carry out this reverse-locking, we therefore proceed in the following manner:

the reverse-lock is monitored by retrieving four input data, obtained from the measurements of the sensors, two input data taking a quantitative value, namely the result of test 3 and the direction of travel, and two data taking a gradual qualitative value namely the heading of the vehicle (heading) and the distance to the back vehicle (dar), operating instructions for acting on the speed and the direction of travel which take a quantitative value and on the wheel lock which takes a gradual qualitative value are processed and determined on the basis of qualitative rules and are translated and transformed into a quantitative value, the speed, the direction of travel and the wheel lock of the vehicle are acted upon as a function of the quantitative values obtained.

The carrying out of realignment (29) comes about in the fourth realignment phase when the third phase has terminated. The carrying out of realignment is performed by simultaneously administering the lateral position and the longitudinal position of the vehicle. To administer the longitudinal position of the vehicle, we proceed in the following manner:

the longitudinal position is monitored by retrieving four input data obtained from measurements of sensors, two input data taking a quantitative value namely the result of test 4 and the direction of travel of the vehicle and two input data taking a gradual qualitative value namely the distance to the back vehicle (dar) and the distance to the front vehicle (dav), operating instructions for acting on the speed and the direction of travel which both take a quantitative value are then processed and determined, the speed and the direction of travel are acted upon as a function of these two quantitative output values obtained.

Simultaneously, to administer the lateral position of the vehicle during the realignment operation, we proceed in the following manner:

the lateral position of the vehicle is monitored by retrieving three input data obtained from the measurements of sensors, two input data taking a quantitative value namely the direction of travel and the result of test 4, and the other input data item taking a gradual qualitative value namely the heading of the vehicle, the operating instruction for the wheel lock which takes a gradual qualitative value is processed and determined on the basis of qualitative rules and is translated and transformed subsequently into a quantitative value, the wheel lock of the vehicle is acted upon as a function of the quantitative output value obtained.

For each of the phases, the operating instruction regarding the speed takes a quantitative value. In a preferential but nonlimiting mode, the operating instruction regarding the speed can take three quantitative values, these values corresponding to the zero speed, to a low speed and to a medium speed, these speeds being expressed in meters per second.

Likewise, the operating instruction for acting on the direction of travel takes a quantitative value. This value is either forward, backward or idling.

As far as the operating instruction for acting on the wheel lock is concerned, this takes one or more gradual qualitative values which is/are translated subsequently into a single quantitative value corresponding to an angle of wheel lock.

FIGS. 10*a*, 10*b*, 10*c* and 10*d* depict several graphs or charts which will make it possible to explain the manner in which positioning, locking, reverse-locking and realignment are carried out. For the figures depicted here, it is necessary to carry out the positioning and in particular to determine the operating instruction so as to carry out the lateral locating of the vehicle. However the process remains the same for the achieving of the longitudinal position in the positioning operation and for the carrying out of the operations of locking, reverse-locking and realignment, the input and output variables and the qualitative rules of determination being modified as a function of the criteria for choosing the operating instructions.

Figure 10A:
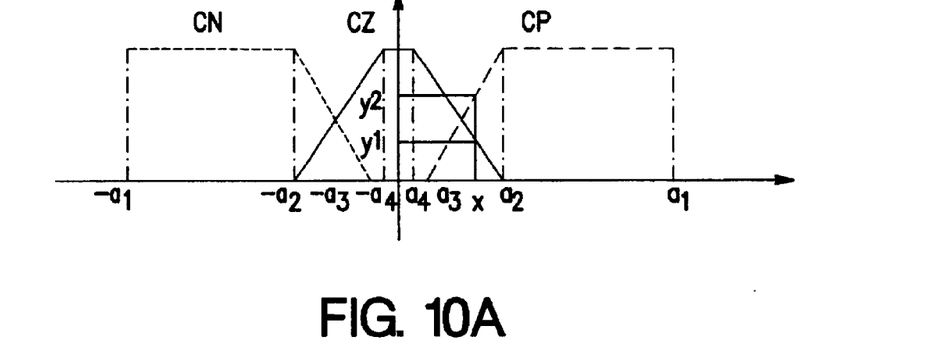
Figure 10B:
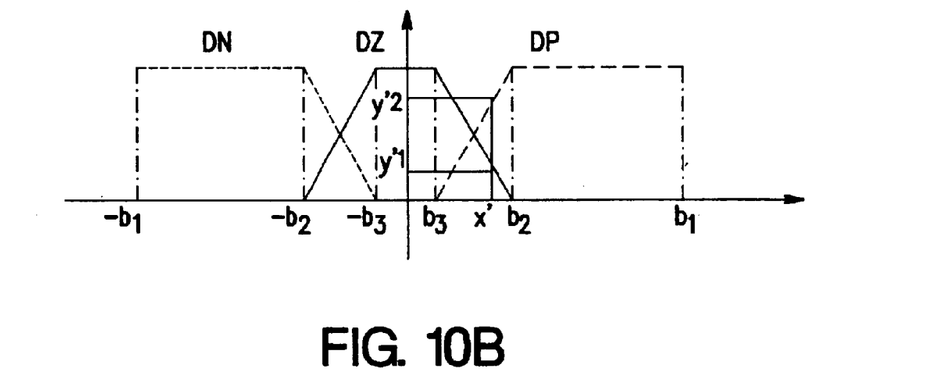

For the vehicle positioning operation, the lateral position of the vehicle and the longitudinal position are monitored simultaneously. As far as the lateral position of the vehicle is concerned, four input data are retrieved, two of them are quantitative data which retain their value as it stands, namely the direction of travel which takes the value forward, backward or idling which is for example quantized by −1, 0 and 1 or negative, zero, positive, and test 1 which is validated or non validated or can be quantized for example by the values 0 or 1. The other two input data, namely the heading of the vehicle (heading) and the relative lateral distance (dlatavr), are the quantitative data which the operator can more or less assess and approximate and are therefore translated and transformed into gradual qualitative data which therefore need to be determined.

To do this, FIG. 10*a* depicts a partitioning graph for the heading of the vehicle input (heading) which makes it possible to switch from the quantitative value to one or more gradual qualitative values. The partitioning graph of FIG. 10*a* which is a preferential but nonlimiting mode depicts along the abscissa a quantitative value of the heading of the vehicle whose unit is for example the radian, that is to say the measurement obtained directly from the sensors of the vehicle. Along the ordinate it depicts various gradual qualitative values which the heading of the vehicle (heading) can take. These values correspond to the assessment that one or more operators would have as regards the orientation of the vehicle.

For example, a negative heading (CN) of the vehicle is defined by the gradual interval, also referred to as a fuzzy interval $[-a_1 -a_1 -a_2 -a_3]$ (in radians). When the quantitative value of the heading lies in the interval $[-a_1 -a_2]$ (in radians), the heading is regarded as negative with a degree of 1, when it lies in the interval $[-a_2 -a_3]$, the heading is regarded as negative with a diminishing degree vanishing beyond $-a_3$.

Likewise, a zero heading (CZ) is defined by the gradual interval $[-a_2 -a_4 \ a_4 \ a_2]$ (in radians), the heading being regarded as zero with a rising degree over the interval $[-a_2 -a_4]$ with a degree of 1 over the interval $[-a_4 \ a_4]$ and with a diminishing degree over the interval $[a_4 \ a_2]$.

Likewise the positive heading (CP) is defined by the gradual interface $[a_3 \ a_2 \ a_1 \ a_1]$ (in radians). When the quantitative value of the heading lies in the interval $[a_2 \ a_1]$, the heading is regarded as positive with a degree of 1. When it lies in the interval $[a_3 \ a_2]$, the heading is regarded as positive with a rising degree taking the value 1 at $a_2$.

For example, for a vehicle heading value equal to x depicted in FIG. 10*a*, the heading therefore takes the gradual qualitative value $y_1$ zero heading and $y_2$ positive heading, $y_1$ and $y_2$ being degrees lying between 0 and 1 that correspond to the assessment that a driver would have of the orientation of his vehicle, that is to say + or − straight heading or + or − heading inclined in a direction.

The partitioning graph for the relative lateral distance input (dlatavr) in FIG. 10*b* depicts along the abscissa the quantitative value (in meters) provided by the measurements from the sensors and along the ordinate the gradual qualitative value or values taken by the input data item (dlatavr).

Thus, the relative lateral distance (dlatavr) is defined qualitatively as a negative lateral distance (DN) by the gradual interval $[-b_1 -b_1 -b_2 -b_3]$ (in meters). When the quantitative value of the relative lateral distance lies in the interval $[-b_1 -b_2]$, the latter is regarded as negative with a degree of 1. When the quantitative value lies in the interval $[-b_2 -b_3]$, the relative lateral distance is regarded as negative with a diminishing degree vanishing beyond $-b_3$.

Likewise, a zero relative lateral distance (DZ) is defined by the gradual interval $[-b_2 -b_3 \ b_3 \ b_2]$ (in metres), the relative lateral distance (dlatavr) being regarded as zero with a rising degree over the interval $[-b_2 -b_3]$, with a degree of 1 over the interval $[-b_3 \ b_3]$ and with a diminishing degree over the interval $[b_3 \ b_2]$.

Likewise a positive relative lateral distance (DP) is defined by the gradual interval $[b_3 \ b_2 \ b_1 \ b_1]$ (in meters). When the quantitative value of the relative lateral distance (dlatavr) lies in the interval $[b_2 \ b_1]$, the latter is regarded as positive with a degree of 1. When the value lies in the interval [$b_3$ $b_2$], the relative lateral distance is regarded as positive with a rising degree taking the value 1 at $b_2$.

For example, for a quantitative value of the relative lateral distance (dlatavr) equal to x' (in meters), two gradual qualitative values of the relative lateral distance (dlatavr) are obtained, equal to $y'_1$ zero lateral distance and $y'_2$ positive lateral distance where $y'_1$ and $y'_2$ are degrees lying between 0 and 1.

These values correspond to the assessment that an operator would have of the relative lateral distance (dlatavr), namely the right edge (44) of the vehicle lies + or − at the median of the lateral position instruction (20) and the right edge (44) lies + or − above the median of the lateral position instruction (20).

Once the gradual qualitative input values have been determined, output instructions which, in the case of lateral positioning, is the relative lock of the wheels of the vehicle which also takes one or more gradual qualitative output values, are processed and determined.

Figure 10C:
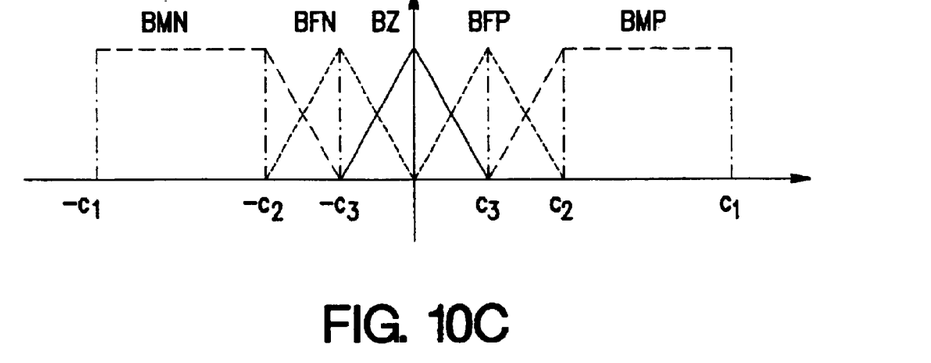

These gradual qualitative output values of the relative lock angle are defined in the following manner:

- a medium negative lock angle (BMN) by the gradual interval [$-c_1$ $-c_1$ $-c_2$ $-c_3$], the angle of lock being regarded as medium negative with a degree of 1 when its quantitative value lies in the interval [$-c_1$ $-c_2$] and as medium negative with a diminishing degree over the interval [$-c_2$ $-c_3$],
- a small negative lock angle (BFN) by the gradual interval [$-c_2$ $-c_3$ 0], the angle of lock being regarded as small negative with a rising degree when its quantitative value lies in the interval [$-c_2$ $-c_3$] and as small negative with a diminishing degree over the interval [$-c_3$ 0],
- a zero lock angle (BZ) by the gradual interval [$-c_3$ 0 $c_3$], the angle of lock being regarded as zero with a rising degree when its quantitative value lies in the interval [$-c_3$ 0] and as zero with a diminishing degree over the interval [0 $c_3$],
- a small positive lock angle (BFP) by the gradual interval [0 $c_3$ $c_2$], the angle of lock being regarded as small positive with a rising degree when its quantitative value lies in the interval [0 $c_3$] and as small positive with a diminishing degree over the interval [$c_3$ $c_2$],
- a medium positive lock angle (BMP) by the gradual interval [$c_3$ $c_2$ $c_1$ $c_1$], the angle of lock being regarded as medium positive with a degree of 1 when its quantitative value lies in the interval [$c_2$ $c_1$] and as medium positive with a rising degree over the interval [$c_3$ $c_2$].

The quantitative values $c_1$, $c_2$ and $c_3$ are dimensionless and correspond to values relating to the maximum lock angle of the vehicle. Consequently these values lie in the interval [−1 1] a value of −1, respectively 1, corresponds to the maximum locking of the wheels to the left, respectively to the right.

Figure 10D:
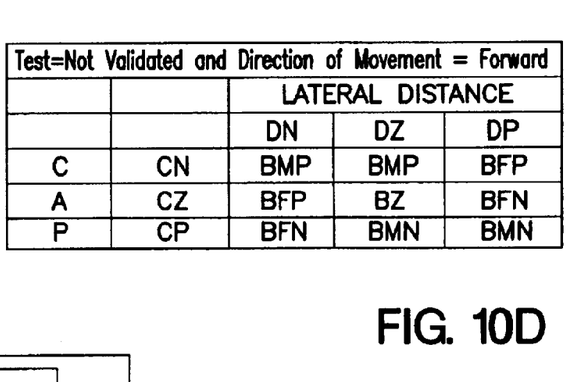

To process and determine these qualitative values regarding the relative lock of the wheels which makes it possible to carry out the lateral positioning in the positioning operation, charts depicted in FIG. 10d, which are referred to as the "hyper rectangle of determination of the lateral position monitor", are used.

In the case of lateral positioning, this hyper rectangle of determination of the lateral position monitor is a chart of qualitative rules which, on the basis of the four inputs, two quantitative inputs (the result of test 1 and direction of travel) and two gradual qualitative inputs (heading and dlatavr), determines an output value of the relative lock of the wheels which here is a gradual qualitative value.

For example, for the value x of the heading of the vehicle (heading), measured by the sensors, the graph of FIG. 10a yields two gradual qualitative values $y_1$ zero heading and $y_2$ positive heading with $y_1$ and $y_2$ lying between 0 and 1. The quantitative value x' of the relative lateral distance (dlatavr), the graph of FIG. 10b yields two gradual qualitative values $y'_1$ zero distance and $y'_2$ positive distance with $y'_1$ and $y'_2$ lying between 0 and 1.

Next, if test 1 is not validated and the direction of travel is forward, then the hyper rectangle of determination of the lateral position monitor of FIG. 10d is employed and makes it possible to obtain one or more gradual qualitative values of the relative angle of lock output.

For a zero heading (CZ) and a zero distance (DZ), a zero lock (BZ) is then obtained and is weighted by a coefficient dependent on the values of $y_1$ and $y'_1$.

For a positive heading (CP) and a zero distance (DZ), a medium negative lock (BMN) is obtained and is weighted by a coefficient dependent on the values of $y_2$ and $y'_1$.

For a zero heading (CZ) and a positive distance (DP), a small negative lock (BFN) is obtained and is weighted by a coefficient dependent on the values of $y_1$ and $y'_2$.

For a positive heading (CP) and a positive distance (DP), a medium negative lock (BMN) is obtained and is weighted by a coefficient dependent on the values of $y_2$ and $y'_2$.

Hence, four qualitative values are obtained for the relative lock of the wheels, namely $Z_1$ zero lock, $Z_2$ medium negative lock, $Z_3$ small negative lock, $Z_4$ medium negative lock, where $Z_1$, $Z_2$, $Z_3$ and $Z_4$ are four values lying between 0 and 1 which depend on two coefficients out of $y_1$, $y'_1$, $y_2$ and $y'_2$.

On the basis of these four gradual qualitative values obtained for the relative lock of the wheels, one then deduces therefrom one single quantitative output value for the angle of relative lock of the wheels. This quantitative output value of the relative lock of the wheels is then calculated by mathematical procedures such as for example by the barycentric procedure.

Likewise, if the test is non validated and the direction of travel is backward, then four gradual qualitative values are obtained for the values x of the heading and x' of the relative lateral distance (dlatavr) of FIGS. 10a and 10b for the relative lock of the wheels output on the basis of the hyper rectangle of determination of the lateral position monitor depicted in FIG. 10d, namely:

- for a positive heading (CP) and a zero distance (DZ), a medium positive lock qualitative value (BMP) is obtained and is weighted by a coefficient dependent on the values of $y_2$ and $y'_1$,
- for a zero heading (CZ) and a zero distance (DZ), a zero lock qualitative value (BZ) is obtained and is weighted by a coefficient dependent on $y_1$ and $y'_1$,
- for a zero heading (CZ) and a positive distance (DP), a small positive lock qualitative value (BFP) is obtained and is weighted by a coefficient dependent on $y_1$ and $y'_2$,
- for a positive heading (CP) and a positive distance (DP), a medium positive lock qualitative value (BMP) is obtained and is weighted by a coefficient dependent on $y_2$ and $y'_2$.

From these four gradual qualitative values of relative lock of the wheels, namely $Z'_1$ medium positive lock, $Z'_2$ zero lock, $Z'_3$ small positive lock and $Z'_4$ medium positive lock where $Z'_1$ $Z'_2$ $Z'_3$ $Z'_4$ are four values lying between 0 and 1 which depend on two coefficients out of $y_1$, $y'_1$, $y_2$, $y'_2$, we then deduce therefrom a quantitative value of the angle of lock of the wheels which is determined from a mathematical projection calculation for example of the barycentric calculation type.

In the case where test 1 is validated or where the direction of travel is idling, then the lock instruction is zero lock (BZ). From this is deduced a quantitative value of the angle of lock of the wheels by a projection calculation for example of barycentric calculation type.

To process and determine output operating instructions for the longitudinal positioning of the positioning operation, for the locking operation, the reverse-locking operation and the realignment operation, hyper rectangles of determination are also defined.

For the longitudinal positioning, this is a hyper rectangle of determination of the longitudinal monitor which has three inputs, namely the result of test 1, the direction of travel and the relative longitudinal distance (dlavr) and two outputs namely the speed and the direction of travel.

For the locking operation, this is a hyper rectangle of determination of the locking monitor which has three inputs, namely the result of test 2, the heading of the vehicle and the back right distance (ddar), and three outputs namely the relative lock of the wheels, the speed and the direction of travel.

For the reverse-locking operation, this is a hyper rectangle of determination of the reverse-locking monitor which has four inputs, namely the result of test 3, the direction of travel, the heading of the vehicle and the distance with respect to the back vehicle (dar), and three outputs namely the relative lock of the wheels, the direction of travel and the speed.

For the realignment operation, this is a hyper rectangle of determination of the realignment monitor which has four inputs, namely the result of test 4, the direction of travel, the distance with respect to the back vehicle (dar) and the distance with respect to the front vehicle (dav), and three outputs, viz the speed, the direction of travel and the relative lock of the wheels.

Figure 8:
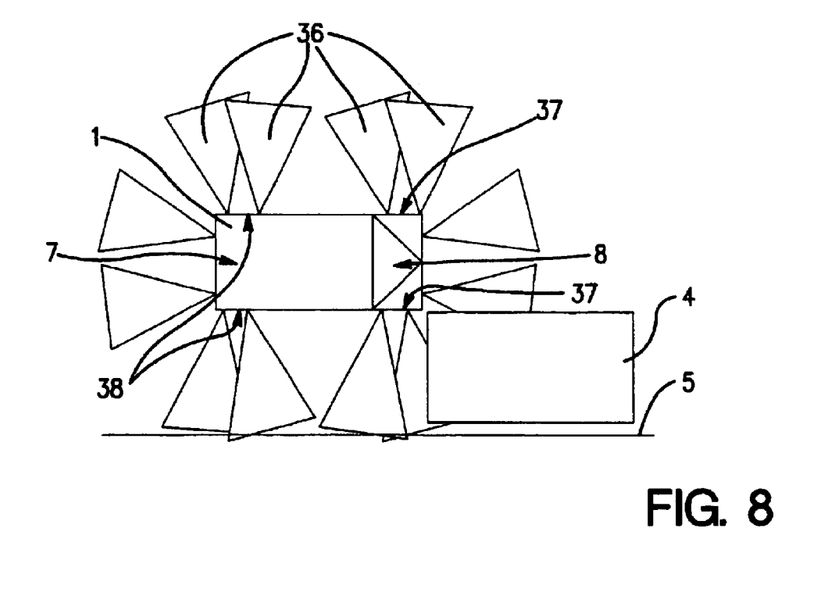
Figure 9:
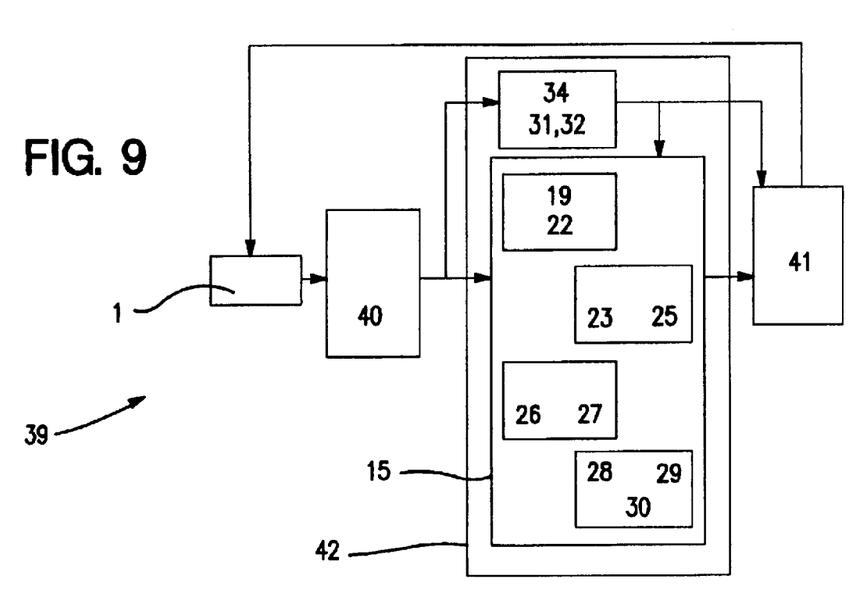

FIGS. 8 and 9 make it possible to explain the device (39) for implementing the method for managing slot parking. This device (39) is installed directly on the vehicle (1).

To retrieve the measurements of the input data, the sensors (36) are installed on the vehicle.

To obtain the various distance measurements which were defined earlier, the vehicle (1) is equipped with sensors for example of infrared, ultrasound or laser telemetry type. Likewise, the vehicle is equipped with sensors of gyrometer type which make it possible to measure the orientation of the vehicle, that is to say the heading of the vehicle. To retrieve the direction of travel and the speed of the vehicle, the latter is equipped for example with tachometer sensors or with wheel speed sensors of the type of those used by ABS systems.

The distance sensors (36) of the infrared, ultrasound or laser type are for example installed on the vehicle, such as depicted in FIG. 8, that is to say at the front (8), left and right, at the back (7), left and right, and on the front lateral side (37) and back lateral side (38).

These sensors are installed in a preferential but nonlimiting mode midway up the height of the vehicle so as to detect all obstacles such as other vehicles, sidewalk curbs and walls, and they must also have in a preferential but nonlimiting mode a cone of detection making it possible to sense in three dimensions.

The input data obtained by means of the measurement sensors are then transmitted to an on-board computer (42) on the vehicle (1). To do this, the device has an input interface (40) which retrieves the signals of the sensors, processes them and then transmits to the on-board computer the information regarding the quantitative measurements of the inputs of the system.

The on-board computer (42) comprises a computer program which transforms some of the quantitative input data into gradual qualitative input data, in particular the measurements of distances and orientation. The on-board computer also performs the various tests namely test 1, test 2, test 3, test 4, test 5 and the safety tests 1 and 2. It also administers the computer programs making it possible to process and determine operating instructions for each of the positioning, locking, reverse-locking and realignment operations. To do this, the computer program comprises the various qualitative rules of each of the hyper rectangles of determination which make it possible to process and determine the output operating instructions.

Once the computer has determined the output operating instructions, the latter are processed by an output interface (41) which transforms the output information from the computer into control signals bound for the actuators of the vehicle controlling the speed, the direction of travel and the relative lock of the wheels. To do this, the computer transforms the gradual qualitative output instruction for the relative lock of the wheels into a quantitative value.

To control the speed, the device uses in a preferential but nonlimiting mode an actuator which controls the angle of opening of the throttle valves which adjust the flow rate of gas mixture into the cylinders in the case of a combustion engine and an actuator which controls the braking system. In the case of an electric motor, the amplitude of the motor supply voltage will, for example, be controlled.

To control the direction of travel of the vehicle, the device has in a preferential but nonlimiting mode a gearbox of automatic gearbox or robotized gearbox type which makes it possible to actuate the forward direction of travel or the backward direction of travel depending on the forward reverse ratio chosen by the operator. In the case where the motor is of electric type, the device can then act directly on the sign of the signal of the electric current which controls the direction of rotation of said motor depending on the direction of travel chosen by the operator.

As far as the control of the angle of relative lock of the wheels is concerned, the device acts in a preferential but nonlimiting mode directly on the torque motor which controls the steering column of the vehicle and hence the angle of lock of the wheels, or on the motor or motors which control the locking of the wheels in the case of columnless electric steering.

In another embodiment, the device uses a visual and/or audible and/or kinesthetic interface which informs the operator directly as to the maneuvers to be performed to park the vehicle. In this case, the actuators are directly the hands and the feet of the operator which act on the steering wheel, the gearbox, the accelerator pedal, brake pedal and clutch pedal.

The visual and/or audible and/or kinesthetic interface then informs the operator while the maneuver is progressing as to the actions which he should perform on the steering wheel, the gearbox, the accelerator pedal, brake pedal and clutch pedal to be able to park the vehicle in a slot. For example, the visual interface may be equipped with a screen, with a voicebox or with means of vibration of the steering wheel which indicates to the operator that he should begin and/or terminate the parking maneuver. This visual and/or audible and/or kinesthetic interface can be installed on the vehicle for the safety of the operator who prefers to be informed by the on-board computer and to act on the vehicle by himself so as to park it in a slot rather than allow it to be guided automatically.

In the case where the operator is informed visually and/or aurally and/or kinesthetically of the controls to be performed on the vehicle, said vehicle is then, in a preferential but nonlimiting mode, equipped with means for limiting the actions of the driver which make it possible to avoid improper maneuvers when he acts on the control members such as the steering wheel, the gearbox, the accelerator pedal, brake pedal and clutch pedal. Thus the operator has control of the vehicle to the extent that he does not make any maneuvering error, in the converse case the means of limitation will inform him of his improper maneuvers while limiting for example the rotation of the steering wheel or the wheel lock or else the speed of the vehicle.

What is claimed is:

1. A method for managing slot parking of a vehicle (1) with respect to immediate surroundings and obstacles, the method comprising:
   a locking phase (23, 25); and
   a reverse-locking phase (26, 27),
   said locking phase and said reverse-locking phase using measurement sensors (36) for measuring distance, orientation and vehicle speed to evaluate (10) a space available (2) with respect to the immediate surroundings (3) to perform the locking and reverse-locking phase by operating on the vehicle speed, a vehicle direction of travel and a relative lock of wheels of the vehicle, wherein,
   retrieving input data originating from the measurement sensors (36) to obtain quantitative input values,
      translating at least some of the quantitative input values into gradual qualitative input values,
      on a basis of qualitative rules, determining operating instructions that provide gradual qualitative output data and quantitative output data,
      transforming the gradual qualitative output data into quantitative output data, and
      controlling actuators of the vehicle (1) as a function of the quantitative output data.

2. The method of claim 1, performed in real time by retrieving the input data at each instant and by controlling the actuators at each instant during the locking phase and said reverse-locking phase.

3. The method of claim 1, further comprising a positioning phase administering a lateral position of the vehicle with respect to the obstacles by
   monitoring the lateral position of the vehicle, with respect to a lateral position instruction, on a basis of
      measurement data from the sensors,
      quantitative data involving the direction of travel and a result of a first test, and
      gradual qualitative data involving a heading of the vehicle (1) and a relative lateral distance,
   determining an operating instruction for the relative lock of the wheels by transforming a gradual qualitative value into a quantitative value, the determination of the operating instruction using qualitative rules of determination of a lateral position monitor, and
   acting on a wheel lock as a function of the determined operating instruction.

4. The method of claim 3, wherein,
   the positioning phase (19, 22) is carried out by administering, in parallel with the administration of the lateral position, a longitudinal position of the vehicle with respect to the obstacles by
   monitoring the longitudinal position of the vehicle, with respect of a longitudinal position instruction, and with respect to the obstacles on a basis of
      three measurement data from the sensors,
      quantitative data including the result of the first test and the direction of travel, and
      a gradual qualitative data item based on a relative longitudinal distance,
   determining two quantitative output instructions involving the vehicle speed and the direction of travel using qualitative rules of determination of a longitudinal position monitor, and
   acting on the speed and the direction of travel upon as a function of the determined two output instructions.

5. The method of claim 3, wherein the locking phase (23, 25) is carried out once the positioning phase (19, 22) is concluded by
   monitoring the relative lock on a basis of three measurement data from the sensors (36), gradual qualitative data involving the heading of the vehicle and a back right distance with respect to an edge of a parking zone and a quantitative data item resulting from a second test,
   determining three output instructions including two quantitative outputs involving a speed instruction and a direction of travel instruction, and a gradual qualitative output concerning the relative lock of the wheels, using qualitative rules of determination of a lock monitor, and
   transforming the gradual qualitative output into a quantitative output and acting on the wheel lock, the speed and the direction of travel of the vehicle as a function of the determined three output instructions.

6. The method of claim 1, wherein, the reverse-locking phase (26, 27) is carried out once the locking phase (23, 25) is concluded by
   monitoring a reverse-lock of the wheels on a basis of four measurement data from the sensors (36), quantitative data resulting from a third test and the direction of travel, and two gradual qualitative data concerning the heading of the vehicle and a distance to the vehicle,
   determining three output instructions including two quantitative outputs involving the speed and the direction of travel of the vehicle, and a gradual qualitative output concerning the relative lock of the wheels using qualitative rules of determination of the reverse lock,
   transforming the gradual qualitative output into a quantitative output, and
   acting on the wheel lock, the speed and the direction of travel of the vehicle as a function of the determined three output instructions.

7. The method of claim 1, further comprising a phase of realignment (28, 29) of the vehicle, carried out once the reverse-locking phase (26, 27) is concluded, by
   monitoring realignment of the vehicle on the basis of five measurement data from the sensors (36) including two quantitative data involving the result of a fourth test and the direction of travel of the vehicle, and three gradual qualitative data concerning a distance to a back part of the vehicle, a distance to a front part of the vehicle and the heading of the vehicle,
   determining three output instructions including two quantitative outputs involving the speed and the direction of travel of the vehicle, and a gradual qualitative output concerning the relative lock of the wheels using qualitative rules of determination of a longitudinal monitor and of a lateral monitor of realignment,
   transforming the gradual qualitative output into a quantitative output, and
   acting on the wheel lock, the direction of travel and the speed of the vehicle as a function of the determined three output instructions.

8. The method of claim 7, wherein, when the realignment phase (28, 29) has terminated, a fifth test (test 5) (30) for validating the parking (15) is performed and:
- if the fifth test is validated, the parking (15) is concluded, and
- if the fifth test is non validated, the locking phase (23, 25), reverse-locking phase (26, 27) and realignment phase (28, 29) are repeated.

9. The method of claim 1, further comprising:
- a positioning phase (19, 22) preceding the execution of the locking phase and the reverse-locking phase, and
- a realignment phase (28, 29) and following the execution of the reverse-locking phase, wherein,
- the positioning phase is a first phase of the method,
- the locking phase is a second phase of the method,
- the reverse-locking phase is a third phase of the method, and
- the realignment phase is a forth phase of the method.

10. The method of claim 9, wherein two safety tests (31, 32) are performed in parallel while carrying out the four parking phases by:
- as a first safety test (31), verifying that a vehicle operator performs no action on control members of the vehicle (1),
- as a second safety test (32), verifying a distance to a front part of the vehicle and a distance to a back part of the vehicle to ensure that the surrounding obstacles (3) are not modified, wherein,
- if the first safety test (31) is not validated, then a transient halting (33) of the vehicle is performed, followed by a test of halting (34),
- if the test of halting (34) is then validated by the operator, a parking (15) maneuver is completely halted (35),
- and, in parallel with the test of halting, if the second safety test (32) is validated, the parking maneuver is completely halted (35),
- otherwise the parking maneuver is continued.

11. A device (39) for implementing the method of claim 1, comprises:
- measurement sensors (36) for measuring the distance of the vehicle (1) with respect to the surrounding obstacles (3), speeds sensors, direction of travel sensors and vehicle orientation sensors,
- a computer (42) which retrieves the quantitative data from the measurement sensors and transforms the input data into gradual qualitative values and into quantitative values, processes and determines output instructions which have gradual qualitative values and quantitative values and transforms these output instructions into quantitative values, and
- actuators which act on the movements of the vehicle (1) as a function of the quantitative output values transmitted by the computer (42) or an output interface (41) which transmits visual and/or audible and/or kinesthetic information to the driver to guide him in his maneuver.

12. A method of slot parking a vehicle, comprising the sequential steps of:
- a first phase, serving as a positioning phase, of locating a vehicle with respect to immediate obstacles in front of and in back of the vehicle;
- a second phase, serving as a locking phase, of moving the vehicle backward and locking wheels of the vehicle to back a rear part of the vehicle into a parking space;
- a third phase, serving as a reverse-locking phase, of moving the vehicle and reverse-locking the wheels to move a front part of the vehicle into the parking space; and
- a fourth phase, serving as a realigning phase, of moving the vehicle, according to available front and back space, while straightening the wheels,
- using measurement sensors for measuring distance, orientation and vehicle speed to evaluate a space available with respect to the immediate obstacles to perform the locking and reverse-locking phases by operating on the vehicle speed, a vehicle direction of travel and a relative lock of the wheels of the vehicle,
- retrieving input data originating from the measurement sensors to obtain quantitative input values,
- translating at least some of the quantitative input values into gradual qualitative input values,
- on a basis of qualitative rules, determining operating instructions that provide gradual qualitative output data and quantitative output data,
- transforming the gradual qualitative output data into quantitative output data, and
- controlling actuators of the vehicle as a function of the quantitative output data.

13. A method for managing a slot parking (15) of a mobile vehicle (1), a locking phase (23, 25) and a reverse-locking phase (26, 27), said method using measurement sensors (36) for measuring distance, vehicle orientation and vehicle speed to evaluate (10) a space available (2) with respect to immediate surroundings (3) so as to perform a parking maneuver, the parking maneuver being carried out by operating on the speed, a direction of travel and a relative lock of the wheels of the vehicle, said method comprising the steps of:
- retrieving input data originating from the measurement sensors (36);
- translating the quantitative input values into gradual qualitative input values,
- on a basis of qualitative rules, determining operating instructions providing gradual qualitative output data and gradual quantitative output data, transforming the gradual qualitative output data into quantitative output data, and
- controlling actuators of the vehicle as a function of the transformed quantitative output data.

* * * * *